United States Patent Office 3,215,674
Patented Nov. 2, 1965

3,215,674
PROCESS FOR POLYMERIZING UNSATURATED ALDEHYDES AND RESULTING PRODUCTS
Igor Sobolev, Albany, Calif., assignor to Shell Oil Company, New York, N.Y., a corporation of Delaware
No Drawing. Filed May 11, 1962, Ser. No. 194,169
17 Claims. (Cl. 260—67)

This invention relates to a new process for polymerizing unsaturated aldehydes. More particularly, the invention relates to a new process for polymerizing alpha-beta-ethylenically unsaturated aldehydes to form high molecular weight polymers which can be easily recovered and processed, and to the resulting improved high molecular weight polymers.

Specifically, the invention provides a new and highly efficient process for converting alpha,beta-ethylenically unsaturated aldehydes, such as acrolein, to high molecular weight water insoluble polymers which can be recovered as finely divided particles. The new process comprises effecting polymerization of the unsaturated aldehyde in an aqueous medium in the presence of a complex of trivalent manganese and a molecularly condensed phosphate.

As a special embodiment, the invention provides a process for preparing a new type of graft copolymer of the alpha,beta-ethylenically unsaturated aldehydes which comprise polymerizing the unsaturated aldehyde in an aqueous medium containing the above-noted complex until the aldehyde has been substantially completely polymerized and then adding a dissimilar ethylenically unsaturated monomer, such as methyl methacrylate.

It is known that unstabilized acrolein changes spontaneously into a solid water insoluble polymer known as disacryl. This same insoluble polymer can also be obtained by heating the acrolein to high temperature with a peroxide. While easy to prepare, these products have never acquired any technical importance due chiefly to their low molecular weight.

It has recently been found that acrolein can be converted to high molecular weight polymers of considerable utility by effecting the polymerization in a water system using certain catalyst systems. One of these special polymerization techniques is disclosed and claimed in copending patent application Serial No. 859,154, filed December 4, 1959, now Patent Number 3,167,529. Unfortunately, however, the polymers produced by these special processes are obtained as soft, sticky, highly swollen mass which is difficult to recover and to handle during subsequent formation of polymer derivatives.

It is an object of the invention, therefore, to provide a new process for polymerizing unsaturated aldehydes, such as acrolein. It is a further object to provide a new process for converting alpha,beta-ethylenically unsaturated aldehydes to polymers having high molecular weights. It is a further object to provide a method for converting unsaturated aldehydes to high molecular weight polymers which can be recovered as finely divided readily filtered particles. It is a further object to provide new high molecular weight polymers of unsaturated aldehydes which can be pulverized and are easily poured or otherwise handled. It is a further object to provide a process which can be used to prepare water-soluble copolymers from unsaturated aldehydes and cationic monomers. It is a further object to provide high molecular weight polymers of unsaturated aldehydes which can be used to form valuable water-soluble and solvent-soluble derivatives. It is a further object to provide a method for preparing high molecular weight polymers of acrolein which are particularly useful in the treatment of paper, textiles, wood and the like. It is a further object to provide a method for preparing new graft copolymers from polymers of unsaturated aldehydes. It is still a further object to provide new graft copolymers of unsaturated aldehydes which are particularly useful and valuable in industry. It is a further object to provide valuable graft copolymers from acrolein which are particularly useful for the treatment of paper so as to impart water resistance and wet strength thereto. These and other objects of the invention will be apparent from the following detailed description thereof.

It has now been discovered that these and other objects may be accomplished by the process of the invention which comprises effecting polymerization of the alpha, beta-ethylenically unsaturated aldehydes in an aqueous medium in the presence of a complex of trivalent manganese and a molecularly condensed phosphate. It has been found that this special process produces polymers which have high molecular weights, e.g., intrinsic viscosities of at least 0.3 dl./g. and preferably 0.6 to 5.0 dl./g., and, in addition, are obtained as finely divided readily filtered particles which are easily isolated and poured or otherwise handled. Such polymers also have a high degree of potentially active aldehyde groups and can be used to form valuable water-soluble and solvent-soluble derivatives. The polymers of the present process have been found to be particularly outstanding for use in making water-soluble derivatives for treatment of paper, textiles and the like. When applied to paper, the water-soluble derivatives of the polymers give paper having unexpectedly high wet strength values.

It has further been found that the new technique may be utilized for the preparation of valuable graft copolymers. In this case the polymerization is continued in the presence of the above-noted complex until the unsaturated aldehyde is substantially completed, polymerized, and then a dissimilar ethylenically unsaturated monomer, such as methyl methacrylate, is added and the polymerization continued. It has been found that under these conditions the complex reacts with the already formed aldehyde polymers yield free radical intermediates and these are capable of initiating polymerization with other monomers which may be present in the reaction mixture. As a result, the product will have a graft structure with a main chain made up of the aldehyde polymer and a plurality of side chains attached thereto made up of polymers of the dissimilar monomer.

The process of the invention comprising effecting polymerization of the unsaturated aldehyde in an aqueous medium containing a complex of trivalent manganese and a molecularly condensed phosphate, such as, for example, manganic pyrophosphate, manganic hexametaphosphate, manganic tripolyphosphate and the like. All of the known types of condensed phosphates are suitable complexing agents for the manganic ion. These include the linear polyphosphates, that is, salts of polyphosphoric acids having the structure

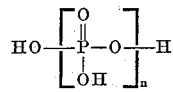

wherein n is at least 2. Pyrophosphate ($n=2$), tripolyphosphate ($n=3$) and the more highly condensed phosphates ($n$ greater than 3) generally known as metaphosphates are particularly effective. Also included are the salts of cyclic polyphosphoric acids having the structure

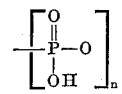

where $n=$greater than 3.

The quantity of condensed phosphate and manganic ion used in making the complex preferably correspond to a $P_2O_5:M_n^{+3}$ ratio of 1.8:1 to 50:1, and more preferably from 2:1 to 4:1.

These complexes of manganic ion and molecular condensed phosphates are prepared in solution and this solution is then added to the reaction medium containing the monomer. The complexes are prepared generally as follows: a manganous salt such as manganous sulfate is oxidized in the presence of a condensed phosphate such as sodium acid pyrophosphate, in aqueous solution at pH 0.5 to pH 6.0. This may be done electrolytically or by the use of a chemical oxidizing agent. Alternatively, a manganese salt containing manganese in a higher valence state than +3 is reduced under similar conditions. The preferred method combines reduction and oxidation in one reaction. It involves oxidation of a manganous salt by potassium permanganate in aqueous solution in the presence of sodium acid pyrophosphate.

The amount of the complex employed in the reaction may vary over a wide range. In general, it is preferred to use sufficient complex to furnish from 0.0005 to 0.10 mole of complexed manganic ion per mole of acrolein. Particularly preferred amounts vary from 0.0005 to 0.01 mole of complexed manganic ion per mole of acrolein.

The polymerization reaction is conducted in an aqueous medium. Other materials, of course, may be employed such as mixtures of water and alcohol, and the like. For best results, it is preferred to pour a straight water medium.

The amount of the monomer employed in the reaction mixture may vary over a wide range. In general, it is preferred to keep the concentration of the unsaturated aldehyde below about 30% by weight. Particularly preferred amounts of monomer form about 5% to 20% by weight.

The reaction is conducted at a pH below 7, and preferably at a pH range between 1 and 5. The pH may be adjusted by addition of appropriate agents, such as sulfuric acid and the like.

It is also desirable in some cases to employ emulsifying agents in the solution. Examples of these include, among others, cationic, anionic and non-ionic materials having a great variety of different compositions. Preferred ionic type agents include those having a long chain hydrophobic group, such as, for example, alkali metal and nitrogen-base soaps of higher fatty acids, such as potassium and sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, palmityl amine hydrobromide, and the like, and mixtures thereof. Other examples include the sulfates and sulfonates, such as sulfonated Turkey red oil, stearylsulfonate, sulfonated fatty esters and amides, sulfonated long-chain hydrocarbons, and the like, and mixtures thereof.

Also preferred are the non-ionic surface active agents, e.g., those which are not salts and would not be subject to ionization if added to water. Examples of these agents include, among others, partial esters of polyhydric alcohols and saturated or unsaturated fatty acids and preferably fatty acids containing at least 12 and preferably from 12 to 18 carbon atoms, and hexitans and hextides such as sorbitan or mannitan monolaurate, monopalmitate, monostearate, monooleate or the monoesters of coconut oil faty acids and the like products described in U.S. 2,322,820. Other examples of partial esters of this type include the pentaerythritol and mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylolpropane mono- and distearate, polyglycerol dilaurate, and the like.

Especially preferred materials to be used, particularly because of the superior results obtained therewith, are the esters of the polyhydric alcohols, and particularly the fatty acid esters of alcohols containing 3 to 6 hydroxyl groups.

The amount of the emultifying agent to be employed will vary. In general, the amount of the agent will vary from about .1% to about 60% by weight of the unsaturated aldehyde. Preferred amounts vary from about .5% to 10% by weight of the aldehyde.

The polymerization is also preferably conducted in an inert atmosphere. This may be accomplished by passing inert gases, such as nitrogen, methane, etc. over the reaction mixture or into and through the reaction mixture.

The temperature employed in the process may vary over a considerable range. The lower temperatures generally give higher molecular weight products and they are preferred. Particularly preferred temperatures range from the freezing point of the aqueous medium up to about 50° C. Especially preferred temperatures range from 0° C. to 35° C.

Atmospheric, subatmospheric or superatmospheric pressures may be utilized as desired.

The reaction mixture is preferably agitated during the reaction. This may be accomplished by use of stirrers, tumbling of the reactor and the like. When using stirrers, it is preferred to stir at rates of 100 to 800 r.p.m.

The polymer will form as insoluble white particles. The agitation will tend to keep the particles suspended, but when the agitation is stopped, the particles will settle to the bottom of the reaction mixture. The polymer may be recovered from the reaction mixture by any suitable means, such as filtration, centrifugation and the like. The resulting polymer will contain at most about 50 to 75% water. After recovery, it is generally desirable to wash the polymer with suitable liquid materials, such as methanol, acetone, benzene and the like.

The process of the invention may also be used to copolymerize the above-noted unsaturated aldehydes with another aldehyde or with another compound containing an ethylenic group to form random-type copolymers. Examples of such monomers include acrylonitrile, methacrylonitrile, crotonaldehyde, acrylic acid, methacrylic acid, methyl acrylate, ethyl acrylate, methyl methacrylate, butyl acrylate, vinyl acetate, dibutyl maleate, diethyl maleate, allyl acetate, allyl butyrate, allyl benzoate, vinyl benzoate, vinyl chloride, vinylidene chloride, styrene, butadiene, methyl pentadiene, alpha-methylstyrene, vinylpyridine, N-vinylpyrrolidone, acrylamide, N-methyl acrylamide, isoprene, 1,4-octadiene, diallyl phthalate, divinyl phthalate, divinyl adipate, ethylene, propylene, isobutylene, and the like, and mixtures thereof. Particularly preferred monomers to be employed include the alpha,beta-ethylenically unsaturated nitriles, the alkyl esters of the acrylic and alpha-substituted acrylic acids, vinyl esters of monocarboxylic acids, allyl esters of monocarboxylic acids, olefins, diolefins, unsaturated esters of polycarboxylic acids, and nitrogen-containing monomers as the amides of unsaturated carboxylic acids, all members of the foregoing preferably containing no more than 12 carbon atoms each.

The amount of the above-described unsaturated monomers to be employed with the unsaturated aldehydes in making the copolymers may vary over a wide range. In general, the amount of the dissimilar monomer may vary from about .1% to as high as 80 to 90% of the combined mixture. Preferred amounts of dissimilar monomer vary from about 1% to 50% by weight of the combined mixture.

These dissimilar monomers may be added all at the beginning of the polymerization or continuously or intermittently during the polymerization.

If the process is to be used for the formation of the above-noted graft copolymers, the polymer will be retained suspended in the aqueous system and then the dissimilar monomer added to the reaction mixture and polymerization continued under the above-noted conditions. Dissimilar monomers that may be added at this stage include, among others, those possessing at least one ethylenic group, i.e., a >C=C< group. These polymerizable olefinic compounds may be exemplified by maleic and fumaric acids and their esters, the tetrahalo-ethylenes, the esters of the unsaturated diols, etc. Preferred polymerizable olefinic compounds to be employed in the process of the invention are the vinyl-type compounds, i.e., those polymerizable organic compounds containing at least one $CH_2=C$ group in their molecule. Examples of such monomers are the unsaturated acids, such as acrylic acid and the alpha-alkyl substituted acrylic acids, such as alpha-methyl acrylic acid and alpha-butyl acrylic acid; the esters of these unsaturated acids, such as methyl acrylate, methyl methacrylate, butyl methacrylate, and propyl acrylate; the vinylidene halides, such as vinylidene chloride and vinylidene bromide; the vinyl esters of inorganic acids, such as the halogen acids, and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl laurate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; and the vinyl ketones, such as vinyl butyl ketone, and vinyl ethyl ketone. The group also includes the allyl derivatives, such as the allyl esters of the monocarboxylic acids, as allyl acetate and allyl butyrate; the allyl esters of the polycarboxylic acids, such as diallyl phthalate, diallyl adipate, and diallyl succinate, the allyl esters of the inorganic acids, such as allyl chloride, methallyl chloride, etc.; the allyl esters of the unsaturated acids, such as allyl acrylate, allyl crotonate and methallyl methacrylate, and the allyl ketones, allyl ethers, and the like.

A preferred group of vinyl-type compounds are the members of the group consisting of the vinylidene halides, acrylic acid and alpha-alkyl substituted acrylic acids wherein the alkyl radical contains from 1 to 4 carbon atoms, the alkyl esters of acrylic acid and alpha-alkyl substituted acrylic acids wherein the alkyl radicals in the alcohol portion of the ester radical contains from 1 to 6 carbon atoms and the alkyl radical substituted on the acrylic acid contains from 1 to 4 carbon atoms, the vinyl esters of the acrylic acid and the alpha alkyl substituted acrylic acid wherein the alkyl radical contains from 1 to 4 carbon atoms, the vinyl esters of the saturated monocarboxylic acids containing from 1 to 6 carbon atoms, the vinyl esters of the halogen acids, acrylonitrile, methacrylonitrile, and ethacrylonitrile.

Examples of this preferred group of vinyl-type compounds are vinylidene chloride, vinylidene bromide, vinylidene iodide, methyl acrylate, butyl acrylate butyl alpha-butyl acrylate, vinyl acrylate, vinyl acetate, vinyl butyrate, vinyl methacrylate, and the like.

In case the monomer is to be added to produce a plasticizing effect on the resulting polymer the ones selected will be those which form polymers which are softer and more flexible than the preformed high molecular weight, linear polymer, such as methyl methacrylate, vinyl acetate, vinyl propionate, vinyl butyrate, methyl acrylate, and the like.

The amount of the dissimilar monomer to be added to the reaction mixture may vary over a wide range. In general, it is preferred to add from 5 parts to 300 parts per 100 parts of preformed polymer. The reaction can, of course, be stopped as by adding polymerization inhibitors when the desired amount of the dissimilar monomer has been polymerized. Polymerization can also be stopped by addition of compounds capable of reducing complexed manganic ion, such as sulfur dioxide, alkali metal bisulfites, etc.

The addition of the dissimilar monomer can be made all at once or continuously or intermittently over the course of the polymerization. If more than one dissimilar monomer is to be added, the mixture may be added all at the beginning or one or more of the monomers added continuously or intermittently and the ratio may be maintained constant or varied during the reaction.

During the graft polymerization, it is preferred to exclude the presence of oxygen as in the formation of the basic polymer. This may be done by conducting the polymerization in the presence of an inert material, such as nitrogen.

The temperature and pressure employed in the graft polymerization will be in the same range as described above for the formation of the basic polymer.

At the conclusion of the graft polymerization, the graft copolymer may be recovered as in the case of the basic polymer, i.e., by filtration, centrifugation and the like. After recovery, it is generally desirable to wash the polymer with suitable liquid materials, such as methanol, acetone, benzene and the like. In this case, also, the resulting copolymer will be recovered as finely divided particles.

The polymers and copolymers prepared by the claimed process are solid substantially white high molecular weight products. They have intrinsic viscosities (as determined on the solubilized form) of preferably at least 0.3 dl./g. and still more preferably from 0.5 to 3.0 dl./g. These values are determined by the conventional technique of polyelectrolyte viscosity measurement at 25° C. On a molecular weight basis, such polymers have molecular weights ranging from about 100,000 to 2,000,000 as determined by the light scattering technique.

The polymers are also characterized by the fact that they possess over 95% and preferably 97–99.5% or greater percent theoretical aldehyde functional, i.e., when the polymer is subjected to conventional test for presence of aldehyde groups (e.g., addition of hydroxylamine hydrochloride and titrate liberated water with Karl Fischer reagent) the results show that over 95% of the theoretical aldehyde groups present by addition polymerization at the double bonds are present in the polymer as such or in hydrated form. Further analysis has shown that the polymer contains many groups wherein the aldehyde is in a hydrated form as

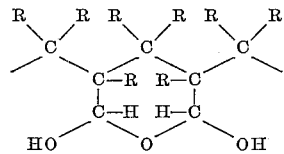

and some

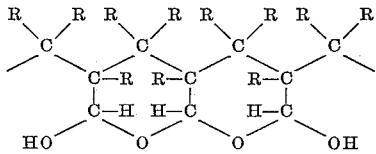

wherein R is hydrogen or hydrocarbon and particularly alkyl, cycloalkyl and aryl radicals containing 1 to 10 carbon atoms. This clearly distinguishes the polymers of the invention from those produced by conventional methods wherein the polymer possesses at most only 60–75% of the theoretical aldehyde function.

The polymers and the acrolein homopolymers and certain copolymers of the random and graft-type are characterized by being insoluble in water and insoluble in conventional solvents, such as benzene, toluene, acetone and the like. Other random copolymers may be soluble in selected solvents and water.

While the above-described polymers may be utilized as such by molding at high temperatures to form plastic articles, they have been found to be of greatest use in the solubilized form.

The water-soluble derivatives of the new high molecular weight polymers may be obtained by variety of methods. They are preferably prepared by suspending the high molecular weight polymer in an aqueous solution containing the water-solubilizing agent, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of the water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalyst or the addition of swelling agents as acetone, tetrahydrofuran may also be employed to assist in the dissolution.

The water-soluble derivatives will have substantially the same molecular weight as the water-insoluble basic polymer. In the case of the sulfur dioxide and bisulfite, the polymer will also contain a plurality of free sulfonic groups or water-soluble salt sulfonate groups contained in the polymer molecule and therefor may be regarded as polymeric polysulfonic acids and polymeric polysulfonate metal salts. For example, the polymer will contain

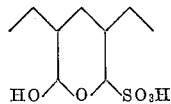

groups. (The backbone of the polymer is as described above.)

The water solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through the conventional padding apparatus.

After the aqueous solution has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexylene glycol, 1,5-pentanediol and the like. The amount of polymer added will generally vary from about 1 to 50 parts of paper per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C. up to and including reflux temperatures of the solution may be employed.

The solvent-soluble polymer derivative may be recovered by any suitable means, such as precipitation, extraction, distillation and the like.

The solvent-soluble polymer derivatives are in most cases substantially white to light colored solids having substantially the same molecular weight as the basic insoluble polymer. The acetal derivatives, for examples, will contain units as

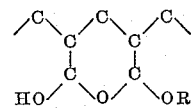

(The backbone of the polymer is as described above.) Wherein R is derived from the alcohol by removing an OH group, such as hydrocarbon radicals as alkyl, cycloalkyl radicals.

The alpha,beta-ethylenically unsaturated aldehydes used in the process of the invention comprise those monoaldehydes having an ethylenic group in the alpha, beta-position relative to the aldehyde group such as, for example, acrolein, and alpha and beta-substituted acroleins as methacrolein, alpha-ethylacrolein, alpha-butylacrolein, alpha-chloroacrolein, beta-phenylacrolein, alpha-decylacrolein, alpha-cyclohexylacrolein, and the like. Preferred aldehydes to be employed in making the polymers include the alpha, beta-monoethylethylenically unsaturated monoaldehydes containing from 3 to 12 carbon atoms, and especially acrolein and the alpha- and beta-substituted acroleins where the substituent on the alpha and/or beta positions is an alkyl, cycloalkyl or aryl group containing no more than 8 carbon atoms. 2-alkenals containing up to 8 carbon atoms come under special consideration.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts in the examples are parts by weight.

*Example I*

This example illustrates the preparation of an acrolein homopolymer and its use as a wet-strength agent for paper.

The manganic pyrophosphate catalyst solution used in this experiment was prepared as follows: To a solution of 200 parts 0.25 M tetrasodium pyrophosphate was added 60 parts 0.9 M sulfuric acid, followed by 100 parts 0.2 M manganous sulfate and 100 parts 0.05 M potassium permanganate solution. The resulting solution is then ready for use as the catalyst.

A solution of 166 parts purified acrolein and 1 part of an ethylene oxide adduct of nonyl phenol in 800 parts of water was deaerated with nitrogen and cooled to a temperature of 3° C. To this solution was added a total of 270 parts manganic pyrophosphate solution in 20 part portions over a period of 3 hours. The reaction mixture was stirred during this time and for an additional hour. The slurry warmed up during this time to room temperature.

The slurry was then filtered and the filter cake washed. After disintegration of the wet cake, the product appeared as finely divided particles which could be easily poured. The water content was 50%. The polymer was quite different from the polymer obtained in a related experiment wherein the acrolein was polymerized in a water system using a redox catalyst system such as potassium persulfate and ferrous sulfate. In that case, the product was a soft wet non-pulverizable mass containing about 70% water.

The above-noted product could be easily dissolved in aqueous sulfurous acid to give a derivative having an intrinsic viscosity of 1.6 dl./g.

0.5%, 1% and 2% water solutions of the above-noted sulfurous acid derivative of the polymer were prepared and used for dip impregnation of kraft and rag paper. This was done by passing the sheets of paper into and through the solutions. The treated sheets were then pressed out on dry paper and allowed to dry at room temperature. The resulting product had the appearance, feel and flexibility of the untreated paper, but demonstrated improvement in fold endurance, dimensional stability and improved wet strength. The wet strengths are shown in the table below:

| Paper | Polymer applied, percent on paper | Wet Strength, p.s.i. | |
|---|---|---|---|
| | | Burst | Tensile |
| Kraft | 0 | 1.2 | <0.5 |
| | 0.5 | 5.9 | 3.3 |
| | 1.0 | 22.5 | 5.1 |
| | 2.0 | 30.3 | 10.7 |
| Rag | 0 | 0.8 | 0.5 |
| | 0.5 | 6.0 | 2.8 |
| | 1.0 | 15.6 | 4.0 |
| | 2.0 | 23.9 | 5.6 |

*Example II*

This example describes the preparation and evaluation of a random copolymer of acrolein and methyl methacrylate.

A solution of 2 parts of an ethylene oxide adduct of nonylphenol in 600 parts of water was deaerated by purging with nitrogen, and 94 parts purified methyl methacrylate monomer as well as 83 parts purified acrolein were added to the solution with mixing. Two hundred parts of manganic pyrophosphate solution prepared as in Example I was added in 20 part portions over a period of 2 hours. The temperature of the reaction mixture was 21-23° C. After addition of the manganic pyrophosphate solution, mixing was continued for one hour.

The reaction mixture was then filtered to recover a solid copolymer. The copolymer was washed as in Example I and after disintegration of the wet cake appeared as a finely divided solid which could be easily poured. Analysis of the copolymer disclosed that it contained about 30% acrolein units and 70% methyl methacrylate units. The copolymer was 98% soluble in acetone. This indicates that acrolein homopolymer, which is insoluble in acetone, was virtually absent.

The above-noted copolymer was also soluble in aqueous sulfurous acid giving moderately clear viscous solutions. Dip impregnation of kraft and rag paper with appropriately diluted sulfurous acid solutions of the copolymer as shown in Example I resulted in improvement in wet strength. This is shown in the table below:

| Paper | Polymer applied, percent on paper | Wet Strength, p.s.i. | |
|---|---|---|---|
| | | Burst | Tensile |
| Kraft | 0 | 0.8 | <0.5 |
| | 0.5 | 2.2 | 1.9 |
| | 1.0 | 2.5 | 2.8 |
| | 2.0 | 6.4 | 3.9 |
| Rag | 0 | 0.7 | <0.5 |
| | 0.5 | 2.5 | 1.5 |
| | 1.0 | 2.3 | 2.1 |
| | 2.0 | 5.6 | 2.9 |

*Example III*

This example illustrates the preparation and use of a polyacrolein-methyl methacrylate graft copolymer.

28 parts of never-dried polyacrolein similar to that described in Example I was dispersed in 800 parts of water. This dispersion was deaerated by alternate evacuation and purging with nitrogen, and 28 parts purified methyl methacrylate monomer was added with mixing, followed by 5 parts 0.9 M sulfuric acid. A total of 40 parts manganic pyrophosphate solution, prepared as in Example I, was added in 2 portions at 10 minute intervals. Mixing of the reaction mixture was continued for 3 hours at a temperature of 21-23° C.

The above solution was then filtered to recover 30 parts of a graft copolymer containing 6% polymerized methyl methacrylate. The product was a finely divided solid. Extraction of this polymer with acetone indicated that non-grafted methyl methacrylate homopolymer (which is soluble in acetone, while the graft copolymer was insoluble) was virtually absent.

Dispersion of the above-noted graft copolymer in aqueous sulfurous acid gave a viscous, somewhat hazy solution. Application of the appropriately diluted solutions to paper by dip impregnation as shown in Example I resulted in appreciable improvement of wet strength as shown in the following table:

| Paper | Polymer applied, percent on paper | Wet Strength, p.s.i. | |
|---|---|---|---|
| | | Burst | Tensile |
| Kraft | 0 | 0.7 | <0.5 |
| | 0.5 | 12.6 | 5.2 |
| | 1.0 | 21.7 | 7.0 |
| | 2.0 | 19.2 | 7.3 |
| Rag | 0 | 0.8 | <0.5 |
| | 0.5 | 8.1 | 2.8 |
| | 1.0 | 14.8 | 4.4 |
| | 2.0 | 28.2 | 5.6 |

*Example IV*

This example describes the preparation of an acrolein homopolymer and its use as a beater additive in the production of paper with improved wet strength.

An acrolein homopolymer was prepared under the conditions described in Example I with the exception that the reaction product was isolated after 3 hours of polymerization. The acrolein conversion was 47%. The product was a finely divided solid homopolymer.

The above-noted homopolymer was dissolved in sodium bisulfite solution which had been adjusted to pH 6.0 with sodium hydroxide. The temperature during dissolution was held at 80° C. The concentration of polymer in the final solution was 2% and that of sodium bisulfite was 1.83%. Aliquots of this solution were added to aqueous slurries containing 0.5% of a beaten, unbleached kraft pulp and alum as indicated in the table below. After adjustment of the pulp slurry to pH 4.5, and mixing for 10 minutes, handsheets were cast and dried in the usual manner. The improvement in wet strength resulting from addition of the acrolein polymer is shown in the following table:

| Pulp | Alum added, percent on pulp | Polymer added, percent on pulp | Final pH of pulp slurry | Wet Strength, p.s.i. | |
|---|---|---|---|---|---|
| | | | | Burst | Tensile |
| Unbleached Kraft | 4 | 0 | 4.5 | 2.2 | <0.5 |
| | 4 | 0.5 | 4.5 | 10.3 | 2.4 |
| | 4 | 1.0 | 4.5 | 8.0 | 2.3 |

*Example V*

The following describes the preparation of a water-soluble, cationic acrolein copolymer and its use as a wet-strength additive for bleached sulfite papers.

A solution of 14.2 parts 2-(trimethylammonium)ethyl methacrylate nitrate (M.P. of pure compound 88–90° C.) in 150 parts water was adjusted to pH 2.5 with dilute nitric acid, deaerated by purging with nitrogen, and then cooled to 0° C. in an ice bath. Thirty-three parts purified acrolein then was added with mixing. Polymerization was initiated by addition of a total of 20 parts manganic pyrophosphate solution in 5 part portions over a period of three hours. The manganic pyrophosphate solution was prepared as described in Example I. The clear, moderately viscous product solution was diluted to a solids content of 2%.

Aliquots of the diluted product solution were added to 0.5% slurries of beaten, bleached sulfite pulp which had been adjusted to pH 8.0 with sodium hydroxide. Hand sheets were cast from these slurries using water for dilution which had also been adjusted to pH 8.0. Tests showed that appreciable wet strength was developed as a result of adding the cationic copolymer. These results are summarized in the table below:

| Pulp | Alum | Polymer added, percent on pulp | Final pH of pulp slurry | Wet Strength, p.s.i. | |
|---|---|---|---|---|---|
| | | | | Burst | Tensile |
| Bleached Sulfite | 0 | 0 | 8.0 | 1.6 | 0.5 |
| | 0 | 0.5 | 8.0 | 6.7 | 1.4 |
| | 0 | 1.0 | 8.0 | 9.6 | 1.3 |
| | 0 | 2.0 | 8.0 | 9.7 | 1.8 |

*Example VI*

Example II is repeated with the exception that the methyl methacrylate is replaced with styrene. The resulting product is a finely divided copolymer of acrolein and styrene which can be heat molded to form attractive plastic articles.

*Example VII*

Example V is repeated with the exception that the 2-(trimethylammonium)ethyl methacrylate nitrate is replaced with 2-trimethylammonium)ethyl methacrylate p-toluenesulfonate. The resulting product is a random copolymer of acrolein and the 2-(trimethylammonium) ethyl methacrylate p-toluenesulfonate which is water-soluble and can be used to impart wet strength to bleached sulfite paper as shown in Example V.

*Example VIII*

Example I is repeated with the exception that acrolein is replaced with methacrolein. Related results are obtained.

*Example IX*

Examples II and III are repeated with the exception that the methyl methacrylate is replaced with acrylonitrile. Related results are obtained.

*Example X*

Examples I to VII are repeated with the exception that the catalyst employed is manganic hexametaphosphate. Related results are obtained.

*Example XI*

Examples I to VII are repeated with the exception that the catalyst employed is manganic tripolyphosphate. Related results are obtained.

*Example XII*

Example II is repeated with the exception that the acrolein is replaced with methacrolein. A white solid polymer is obtained.

*Example XIII*

Example III is repeated with the exception that the methyl methacrylate is replaced with acrylic acid. A graft copolymer is obtained.

*Example XIV*

Example III is repeated with the exception that methyl methacrylate is replaced by the following: ethyl acrylate, methacrylonitrile, vinyl acetate, diethyl maleate and vinyl benzoate. Related results are obtained.

I claim as my invention:

1. A process for polymerizing unsaturated aldehydes which comprises contacting the aldehyde in an aqueous medium with a catalyst consisting of a preformed salt of trivalent manganese and a polyphosphoric acid having the structure

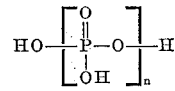

wherein $n$ is at least 2, at a pH below 7.

2. A process for preparing high molecular weight polymers of an alpha,beta-ethylenically unsaturated monoaldehyde recovered as a finely divided readily filterable product, which comprises effecting a polymerization of the aldehyde in an aqueous medium containing a catalyst consisting of a preformed salt of the group consisting of manganic pyrophosphate, manganic hexametaphosphate and manganic tripolyphosphate, at a pH below 7.0.

3. A process as in claim 2 wherein the unsaturated aldehyde is acrolein.

4. A process as in claim 2 wherein the unsaturated aldehyde is methacrolein.

5. A process as in claim 2 wherein the salt catalyst is employed in the amount sufficient to furnish 0.0005 to 0.1 mole of manganic ion per mole of the aldehyde.

6. A process for preparing a high molecular weight polymer of acrolein which comprises contacting the acrolein in an aqueous medium with a catalyst consisting of manganic pyrophosphate and agitating the mixture during the course of the polymerization at a temperature between 0° and 35° C. in the substantial absence of molecular oxygen at a pH between 0.5 and 7.0.

7. A process for preparing a random copolymer of an ethylenically unsaturated aldehyde and a dissimilar ethylenically unsaturated monomer which comprises contacting the mixture of monomers in an aqueous medium with a catalyst consisting of a preformed salt of trivalent manganese and a polyphosphoric acid having the structure

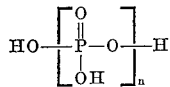

wherein $n$ is a least 2, at a pH below 7.

8. A process as in claim 7 wherein the dissimilar monomer is a vinyl monomer containing from 3 to 25 carbon atoms.

9. A process as in claim 7 wherein the dissimilar monomer is styrene and the mixture of monomer is made up of from 30 to 95 parts of acrolein and 70 to 5 parts of styrene.

10. A process for preparing a graft copolymer which comprises effecting polymerization of an alpha,beta-ethylenically unsaturated aldehyde in an aqueous medium in the presence of a catalyst consisting of a preformed salt of trivalent manganese and a polyphosphoric acid having the structure

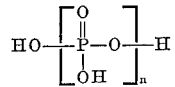

wherein $n$ is at least 2, at a pH below 7, until the aldehyde has been substantially completely polymerized and then adding a dissimilar monomer and then continuing the polymerization.

11. A process as in claim 7 wherein the dissimilar monomer is acrylonitrile.

12. A process as in claim 7 wherein the dissimilar monomer is methyl methacrylate.

13. A process as in claim 7 wherein the dissimilar monomer is acrylic acid.

14. A graft copolymer wherein the main back-bone polymer chain is made up of a polymer of a 2-alkenal containing up to 8 carbon atoms having attached thereto a plurality of side chains consisting of polymer chains made up of units of a dissimilar ethylenically unsaturated monomer, said graft copolymer possessing in the back-bone polymer chain over 95% of the theoretical aldehyde function as determined by addition of hydroxylamine hydrochloride and titration of the liberated water with Karl Fischer reagent.

15. A graft copolymer wherein the main back-bone polymer chain is made up of polyacrolein having attached thereto as a plurality of side chains polymer chains made up of acrylonitrile units, said graft copolymers possessing in the back-bone polymer chain over 95% of the theoretical aldehyde function as determined by addition of hydroxylamine hydrochloride and titration of the liberated water with Karl Fischer reagent.

16. A graft copolymer wherein the main back-bone polymer chain is made up of polyacrolein having attached thereto a plurality of side chains polymer chains made up of methyl methacrylate units, said graft copolymers possessing in the back-bone polymer chain over 95% of the theoretical aldehyde function as determined by addition of hydroxylamine hydrochloride and titration of the liberated water with Karl Fischer reagent.

17. A graft copolymer wherein the main back-bone polymer chain is made up of polyacrolein having attached thereto as a plurality of side chains polymer chains made up of acrylic acid units, said graft copolymers possessing in the back-bone polymer chain over 95% of the theoretical aldehyde function as determined by addition of hydroxylamine hydrochloride and titration of the liberated water with Karl Fischer reagent.

References Cited by the Examiner

UNITED STATES PATENTS

| | | | |
|---|---|---|---|
| 2,527,495 | 10/50 | Fitzhugh | 260—885 |
| 3,079,296 | 2/63 | Houff et al. | 260—67 |
| 3,119,785 | 1/64 | Van Gils | 260—73 |

JOSEPH L. SCHOFER, *Primary Examiner.*

LEON J. BERCOVITZ, *Examiner.*